United States Patent
Hung et al.

(10) Patent No.: US 10,460,146 B2
(45) Date of Patent: Oct. 29, 2019

(54) IMAGE CAPTURE APPARATUS

(71) Applicant: Gingy Technology Inc., Hsinchu (TW)

(72) Inventors: Chun-Lang Hung, Hsinchu (TW); Tsung-Shan Chen, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 129 days.

(21) Appl. No.: 15/470,942

(22) Filed: Mar. 28, 2017

(65) Prior Publication Data
US 2018/0018496 A1    Jan. 18, 2018

Related U.S. Application Data

(60) Provisional application No. 62/363,329, filed on Jul. 17, 2016.

(30) Foreign Application Priority Data
Dec. 16, 2016  (TW) .............................. 105219167 U (51) Int. Cl.
*G06K 9/00*  (2006.01)

(52) U.S. Cl.
CPC ............. *G06K 9/0004* (2013.01); *G06K 9/00* (2013.01); *G06K 9/0008* (2013.01); *G06K 9/00013* (2013.01); *G06K 9/00046* (2013.01); *G06K 9/00087* (2013.01); *G06K 9/00899* (2013.01)

(58) Field of Classification Search
CPC ............. G06K 9/0004; G06K 9/00087; G06K 9/00013; G06K 9/00046; G06K 9/0008; G06K 9/00899

USPC .................................................. 382/124–127
See application file for complete search history.

(56) References Cited

U.S. PATENT DOCUMENTS

| | | | | |
|---|---|---|---|---|
| 6,061,463 A * | 5/2000 | Metz | .................. | G06K 9/00046 382/124 |
| 6,326,644 B1 * | 12/2001 | Lee | ..................... | G06K 9/00013 257/103 |
| 6,440,814 B1 * | 8/2002 | Lepert | ................ | G06K 9/00053 369/126 |
| 6,448,790 B1 * | 9/2002 | Imai | ...................... | G06K 9/0002 324/661 |
| 7,531,448 B2 * | 5/2009 | Wang | ................ | H01L 21/76808 257/E21.495 |
| 8,368,003 B2 * | 2/2013 | Hsu | .................. | H01L 27/14618 250/227.2 |
| 9,501,631 B2 * | 11/2016 | Frye | ........................ | G06F 21/32 |
| 2007/0253607 A1 * | 11/2007 | Higuchi | ............. | G06K 9/00026 382/124 |
| 2015/0294099 A1 * | 10/2015 | Frye | ........................ | G06F 21/32 340/5.83 |
| 2017/0084774 A1 * | 3/2017 | Im | .......................... | H01L 31/153 |

* cited by examiner

*Primary Examiner* — Daniel G Mariam
(74) *Attorney, Agent, or Firm* — JCIPRNET (57) ABSTRACT

An image capture apparatus includes an imaging unit and a light receiving device is provided. The imaging unit includes an electrode, a light emitting layer disposed on the electrode and a first dielectric layer disposed on the light emitting layer. At least one portion of an object is in contact with a portion of the first dielectric layer so that the light emitting layer emits an image light beam correspond to the portion of the first dielectric layer. The light receiving device is disposed on a transmission path of the image light beam.

23 Claims, 7 Drawing Sheets

IMAGE CAPTURE APPARATUS

CROSS-REFERENCE TO RELATED APPLICATION

This application claims the priority benefits of U.S. provisional application Ser. No. 62/363,329, filed on Jul. 17, 2016, and Taiwan application serial no. 105219167, filed on Dec. 16, 2016. The entirety of each of the above-mentioned patent applications is hereby incorporated by reference herein and made a part of this specification.

BACKGROUND OF THE DISCLOSURE

Field of the Disclosure

The disclosure relates to an image capture apparatus, and particularly to an image capture apparatus for a biometric identification module or apparatus.

Description of Related Art

Types of biometric identification include face recognition, voice recognition, iris recognition, retina recognition, vein recognition, and fingerprint recognition. Since the fingerprints of each person are unique and are not likely to change as the age increases or health condition changes, fingerprint recognition system is currently the most widely used biometric identification system. Fingerprint identification system may be categorized into optical, capacitive, ultrasound and thermo-sensitive techniques according to the sensing method.

An optical fingerprint identification system includes an image capture apparatus and a processing unit. A conventional image capture apparatus includes a light source, a light receiving device and a transparent pressing plate. The light source is used for emitting light beam to irradiate the finger pressing on the transparent pressing plate. Fingerprints on fingers are made up of many irregular protruded patterns (i.e. protruded part of fingerprint) and recessed patterns (i.e. recessed part of fingerprint). When finger presses the transparent pressing plate, the protruded pattern is in contact with the transparent pressing plate and the recessed patterns are not in contact with the transparent pressing plate. On a conventional optical fingerprint identification sensor, the wave peak part forms a dark region whereas the wave valley part forms a light region; accordingly, a light and dark alternating finger image is formed on a light receiving surface of a light receiving device. The light receiving device converts the fingerprint image into corresponding image information, and the image information is input into the processing unit. The processing unit may calculate the image information corresponding to the fingerprint using algorithm for authenticating user's identification. However, during the image capturing process, both of the protruded pattern and recessed pattern of fingerprint reflect light beam. When there is no significant difference between the light intensity of the light beam reflected by the protruded pattern and that reflected by the recessed pattern, the contrast ratio of fingerprint image obtained by the light receiving device is not high, which is not helpful for authenticating user's identification.

SUMMARY OF THE DISCLOSURE

The disclosure provides an image capture apparatus which is capable of obtaining image with good quality and helpful for identification.

In an embodiment of the disclosure, the image capture apparatus includes an imaging unit and a light receiving device. The imaging unit includes an electrode, a light emitting layer disposed on the electrode and a first dielectric layer disposed on the light emitting layer. At least one portion of an object is in contact with one portion of the first dielectric layer so that the light emitting layer emits an image light beam corresponding to the portion of the first dielectric layer. The light receiving device is disposed on a transmission path of the image light beam.

In another embodiment of the disclosure, the image capture apparatus includes an imaging unit, a light receiving device, a conductive element and an excitation source. The imaging unit includes a transparent substrate carrying at least one electrode, a light emitting layer disposed on the at least one electrode and a first dielectric layer disposed on the light emitting layer. At least one portion of an object is in contact with one portion of the first dielectric layer so that the light emitting layer emits an image light beam corresponding to one portion of the first dielectric layer, and the light receiving device is disposed on a transmission path of the image light beam. A conductive element is disposed on the first dielectric layer of the imaging unit to define at least one non-image capture region which is not in contact with the at least one portion of the object. The excitation source is electrically connected between the conductive element and electrode.

In an embodiment of the disclosure, the image capture apparatus further includes a conductive element. The conductive element is disposed on the first dielectric layer of the imaging unit and has an opening exposing the first dielectric layer, wherein the power supply is electrically connected with the conductive element, and the object is electrically connected with the power supply via the conductive element.

In an embodiment of the disclosure, the image capture apparatus further includes a conductive element. The conductive element is integrated in the first dielectric layer of the imaging unit, and has a sensor region for contacting the object. The power supply is electrically connected with the conductive element, and the object is electrically connected with the power supply via the conductive element.

In an embodiment of the disclosure, the imaging unit further includes a second dielectric layer. The second dielectric layer is disposed between the light emitting layer and electrode.

In an embodiment of the disclosure, the imaging unit is directly disposed on the light receiving device to be in contact with the light receiving device.

In an embodiment of the disclosure, the image capture device further includes a light guide layer. The light guide layer covers the light receiving surface of the light receiving device. The imaging unit is disposed on the light guide layer.

In an embodiment of the disclosure, the image capture device further includes an indicating unit disposed on the imaging unit. The indicating unit includes a first conductive pattern, a first dielectric pattern, a light emitting pattern, a second dielectric pattern, a second conductive pattern and an insulation pattern that are stacked sequentially in a direction away from the imaging unit.

In an embodiment of the disclosure, the imaging unit further includes a second dielectric layer. The second dielectric layer is disposed between the light emitting layer and electrode. The hardness of the first dielectric layer is greater than the hardness of the second dielectric layer.

Based on the above, in the embodiment of the disclosure, the image capture apparatus includes the imaging unit and light receiving device. The imaging unit includes the electrode, the light emitting layer disposed on the electrode and the first dielectric layer disposed on the light emitting layer. At least one portion of the object is in contact with one portion of the first dielectric layer so that the portion of the light emitting layer corresponding to at least one portion of the object is excited to emit the image light beam corresponding to at least one portion of the object. In the meantime, another portion of the object is not in contact with another portion of the first dielectric layer, and another portion of the light emitting layer corresponding to another portion of the first dielectric layer does not emit light. Accordingly, the light receiving device can receive the image of at least one portion of the object having high contrast ratio and helpful for identification.

In order to make the aforementioned features and advantages of the disclosure more comprehensible, embodiments accompanying figures are described in detail below.

DESCRIPTION OF EMBODIMENTS

Figure 1:
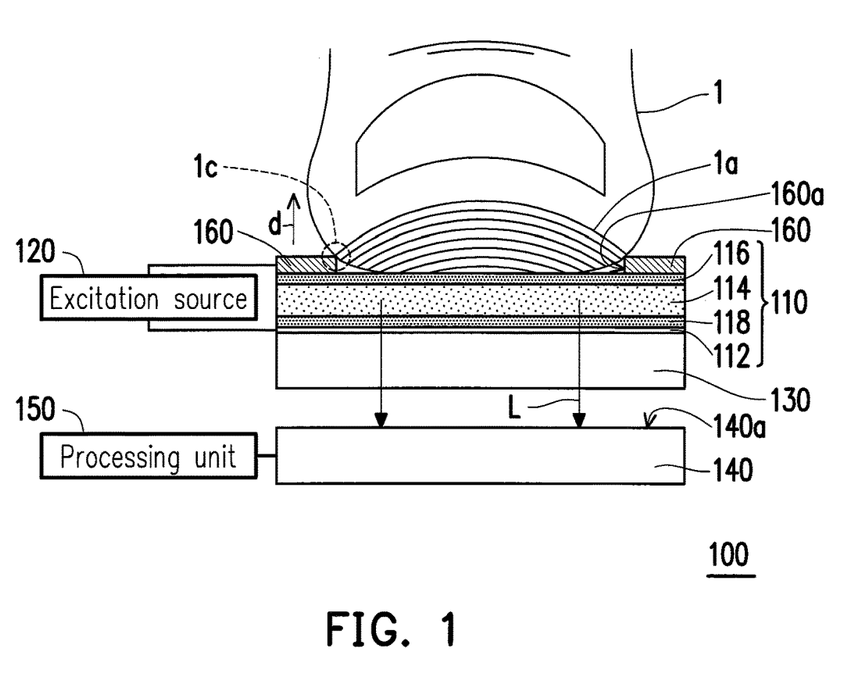
FIG. 1 is a schematic view illustrating an image capture apparatus according to an embodiment of the disclosure.
Figure 2:
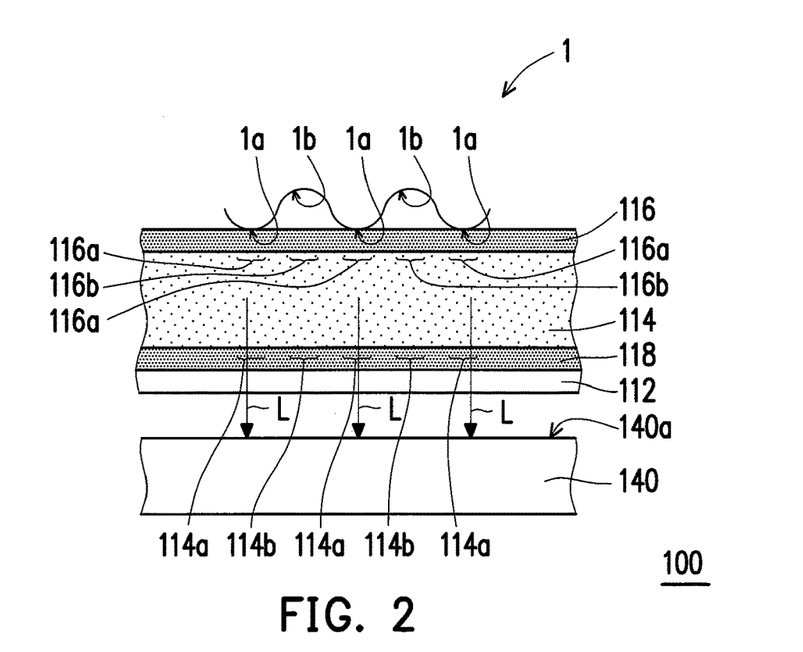
FIG. 2 is an enlargement view illustrating a portion of an image capture apparatus according to an embodiment of the disclosure.

FIG. 1 is a schematic view illustrating an image capture apparatus according to an embodiment of the disclosure. FIG. 2 is an enlargement view illustrating one portion of an image capture apparatus according to an embodiment of the disclosure. Referring to FIGS. 1 and 2, an image capture apparatus 100 is used for capturing an image of at least one portion 1a of an object 1. In normal use, the object 1 is a living creature, and at least one portion 1a of the object 1 is biometric characteristic of the living creature. For example, in the embodiment, the object 1 is a finger, palm print and the like; at least one portion 1a of the object 1 is, for example, a protruding portion of fingerprint; however, the disclosure provides no limitation thereto. According to other embodiments, in the case where the object 1 is a living creature, at least one portion 1a of the object 1 may be other appropriate biometric characteristic. Moreover, the disclosure does not limit that the object 1 must be a living creature. In non-normal use, the object 1 may be a counterfeit object such as a counterfeit finger and the like.

Referring to FIGS. 1 and 2, the image capture apparatus 100 includes an imaging unit 110. The imaging unit 110 includes an electrode 112, a light emitting layer 114 disposed on the electrode 112 and a first dielectric layer 116 disposed on the light emitting layer 114. The electrode 112 is a transparent electrode. In the embodiment, the imaging unit 110 may further include a second dielectric layer 118. The second dielectric layer 118 is disposed between the light emitting layer 114 and electrode 112. The electrode 112, second dielectric layer 118, light emitting layer 114 and first dielectric layer 116 are arranged in sequence in a direction d indicating the object 1. The light emitting layer 114 emits light due to the effect of a corresponding excitation source 120. The material of the light emitting layer 114 may be an inorganic material, an organic material or a combination thereof. Furthermore, in the embodiment, the light emitting layer 114 may be a mixed layer of a light emitting material and a dielectric material. In addition, in the embodiment, the first dielectric layer 116 may include a surface hard-coating layer by being treated via a hard-coating process, or the first dielectric layer 116 may be provided with a surface hard-coating layer disposed thereon. The hardness of the first dielectric layer 116 may be greater than the hardness of the second dielectric layer 118. Accordingly, when the object 1 presses the image capture apparatus 100, the image capture apparatus 100 is not easily damaged. Furthermore, in an applicable embodiment, a protection layer (not shown) may be formed on the first dielectric layer 116 away from the second dielectric layer 118 for protecting the first dielectric layer 116. In the embodiment, the light emitting layer 114 is, for example, an electroluminescence (EL) layer, though the disclosure is not limited thereto. As shown in FIG. 1, in the embodiment, the imaging unit 110 may be selectively formed on the transparent substrate 130, though the disclosure is not limited thereto. In other embodiments, the imaging unit 110 may be formed on other applicable components. Detailed descriptions are incorporated in the embodiments below with illustration of accompanying drawings.

In other applicable specific solutions according to any one of the embodiments of the disclosure, the transparent substrate 130 may be a micro-structure layer (not shown) that is continuously or non-continuously formed on a surface away from the first dielectric layer 116. The micro-structure layer may be in an elliptic shape or triangular shape.

The image capture apparatus 100 includes the excitation source 120. The excitation source 120 is configured for outputting energy to the electrode 112 of the imaging unit 110 and the object 1. When at least one portion 1a of the object 1 is in contact with one portion 116a of the first dielectric layer 116, the energy output by the excitation source 120 has an effect on one portion of the light emitting layer 114 corresponding to the portion 116a of the first dielectric layer 116 so that the portion 114a of the light emitting layer 114 emits an image light beam L. In the embodiment, the portion 116a of the first dielectric layer 116 and the portion 114a of the light emitting layer 114 may be overlapped in the direction d, though the disclosure is not limited thereto.

The image capture apparatus 100 includes a light receiving device 140. The light receiving device 140 is disposed on a transmission path of the image light beam L. The image light beam L may form an image on a light receiving surface 140a of the light receiving device 140. After the light receiving surface 140a of the light receiving device 140 receives the image light beam L, the light receiving device 140 can convert the image light beam L into an image information corresponding to at least one portion 1a of the object 1. The image information is an electrical signal. In the embodiment, the image capture apparatus 100 may further include a processing unit 150. The processing unit 150 is electrically connected with the light receiving device 140. The processing unit 150 can identify the identification of the object 1 according to the image information. In the embodiment, the light receiving device 140 may be a light receiving device having a two-dimensional sensor array such as a charge-coupled device (CCD), or a complementary metal oxide semiconductor (CMOS) device and the like, though the disclosure is not limited thereto. In addition, the light receiving device 140 may be attached under the transparent substrate 130 via an adhesive, or a light beam transmission path (see FIGS. 1 to 3 which show that a gap is formed between the transparent substrate 130 and light receiving device 140) may be formed between the light receiving device 140 and the transparent substrate 130.

In the embodiment, the excitation source 120 is, for example, power supply. The power supply can output direct current, alternating current or a combination thereof. At least one portion 1a of the object 1 is, for example, a protruded portion of fingerprint. When at least one portion 1a (e.g. protruded portion of fingerprint) of the object 1 is in contact with the portion 116a of the first dielectric layer 116, a circuit is formed between the portion 116a of the first dielectric layer 116 and electrode 112 so that the portion 114a of the light emitting layer 114 corresponding to the portion 116a of the first dielectric layer 116 emits the image light beam L. When at least one portion 1a (e.g. protruded portion of fingerprint) of the object 1 is in contact with the first dielectric layer 116, another portion 1b (e.g. recessed portion of fingerprint) of the object 1 is not in contact with the first dielectric layer 116, and thus no circuit is formed between another portion 116b of the first dielectric layer 116 corresponding to another portion 1b (e.g. recessed portion of fingerprint) of the object 1 and the electrode 112. Also, another portion 114b of the light emitting layer 114 does not emit light. Accordingly, the image light beam L emitted by the light emitting layer 114 can show the image of at least one portion 1a (e.g. protruded portion of fingerprint) of the object 1 so that the light receiving device 140 can receive the image of at least one portion 1a of the object 1 having a high contrast ratio.

Figure 3:
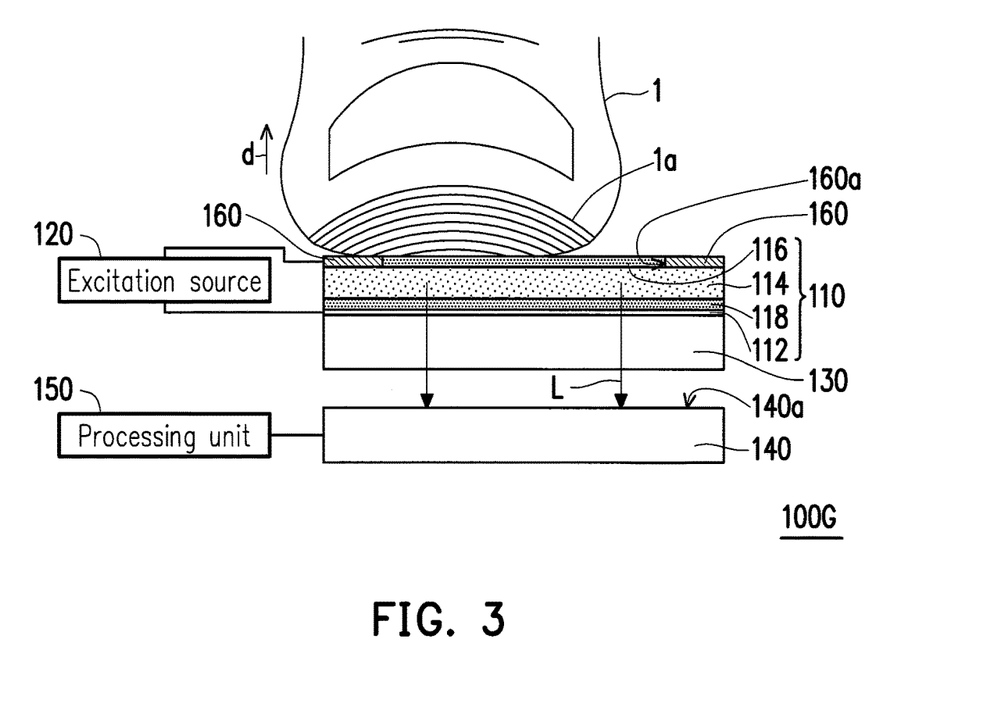
FIG. 3 is a schematic view illustrating an image capture apparatus according to another embodiment of the disclosure.
Figure 4:
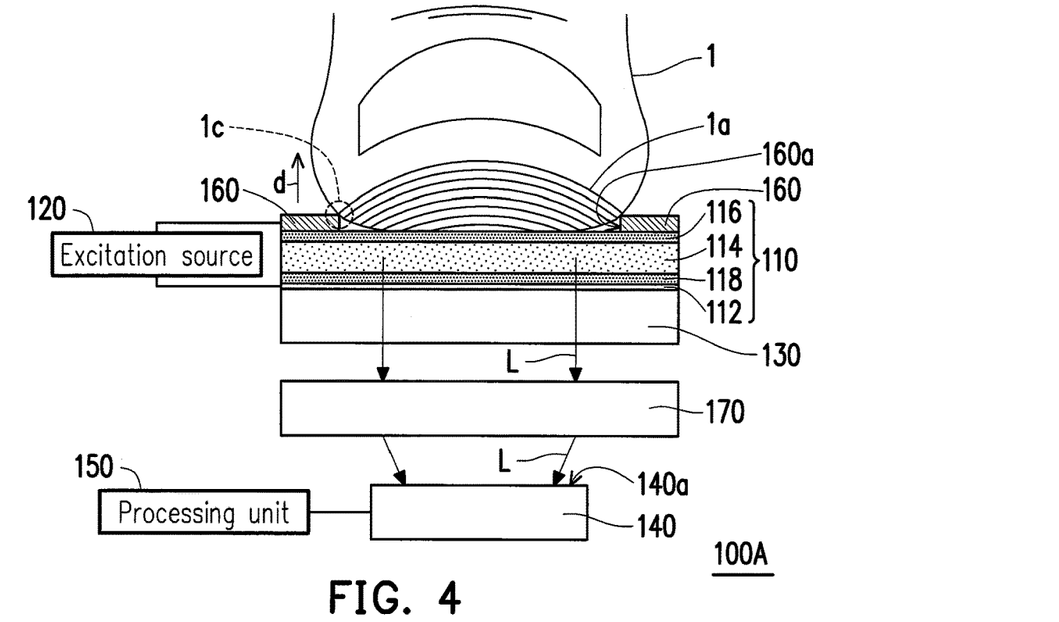
FIG. 4 is a schematic view illustrating an image capture apparatus according to yet another embodiment of the disclosure.

There are various types of energy output by the excitation source 120 and various methods of outputting energy to the object 1. An exemplary embodiment is provided below as an example where the energy output by the excitation source 120 is electrical energy, and the electrical energy is transmitted to the object via the conductive element 160. For instance, in the embodiment, the image capture apparatus 100 further includes the conductive element 160. The conductive element 160 is disposed on the first dielectric layer 116 of the imaging unit 110 and has an opening 160a exposing the first dielectric layer 116. In other words, in the embodiment, the conductive element 160 may be formed to have a frame-like shape, though the disclosure is not limited thereto. In other embodiments, the conductive element 160 may be formed to have other appropriate shapes. In the embodiment, as shown in FIG. 1, the conductive element 160 may be selectively disposed above the first dielectric layer 116, though the disclosure is not limited thereto. FIG. 3 is a schematic view illustrating an image capture apparatus according to another embodiment of the disclosure. In an image capture apparatus 100G illustrated in FIG. 3, the conductive element 160 may be integrated within the first dielectric layer 116. The conductive element 160 and the first dielectric layer 116 may be in contact with the same surface of the light emitting layer 114. Such configuration may reduce the overall thickness (not shown) of the image capture apparatus 100G. In any one of the embodiments, the position where the conductive element 160 is disposed forms a non-sensor region. The region of the first dielectric layer 116 that is not covered by the conductive element 160 forms a sensor region. When the user's fingers or palms touch the sensor region, the conductive element 160 may be regarded as a second electrode. The sensor region may be either a flat surface or a curved surface, wherein the conductive element 160 is electrically connected with the first dielectric layer 116. The excitation source 120 is electrically connected with the conductive element 160 and the electrode 112 of the imaging unit 110. When at least one portion 1a of the object 1 is in contact with the portion 116a of the first dielectric layer 116, another portion 1c of the object 1 is in contact with the conductive element 160 at the same time. At this time, the excitation source 120 may transmit energy (e.g. electrical energy) to at least one portion 1a of the object 1 which is in contact with the first dielectric layer 116 via the conductive element 160, so that the portion 114a of the light emitting layer 114 corresponding to at least one portion 1a of the object 1 emits the image light beam L, thereby acquiring the image information of at least one portion 1a of the object 1. It should be noted that there may be various types of energy output by the excitation source 120 and various methods of transmitting the energy to the object 1. The types of energy output by the excitation source 120 is not limited to electrical energy, for example, the energy may be magnetic energy. The excitation source 120 may be further connected to an energy conversion unit (not shown) for converting magnetic energy into electrical energy and further converting the electrical energy into optical energy via the energy conversion unit. Alternatively, other types of energy (e.g. kinetic energy) is converted into electrical energy and then further converted into optical energy via the energy conversion unit. The method of transmitting electrical energy to the object 1 is not limited to the use of conductive element 160. In other embodiments, the types of energy output by the excitation source 120 and methods of transmitting energy to the object 1 may be designed appropriately according to actual needs. FIG. 4 is a schematic view illustrating an image capture apparatus according to another embodiment of the disclosure. An image capture apparatus 100A in FIG. 4 is similar to the image capture apparatus 100 described above; accordingly, identical or corresponding elements are denoted by identical or corresponding reference numerals. The main difference between the image capture apparatus 100A and image capture apparatus 100 lies in that the image capture apparatus 100A further includes a lens 170. The difference is described below in details. Please refer to the above descriptions for identical or corresponding features of the image capture apparatus 100A and image capture apparatus 100.

Referring to FIG. 4, the image capture apparatus 100A includes the imaging unit 110 and the light receiving device 140. The imaging unit 110 includes the electrode 112, the light emitting layer 114 disposed on the electrode 112 and the first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L. Different from the image capture apparatus 100, the image capture apparatus 100A further includes the lens 170. The lens 170 is disposed between the imaging unit 110 and light receiving device 140. The image light beam L passes through the lens 170 to form an image on the light receiving surface 140a of the light receiving device 140. By using the lens 170, the light receiving device 140 can receive the image of at least one portion 1a of the object 1 that has better quality and is helpful for identifying the object 1.

Figure 5:
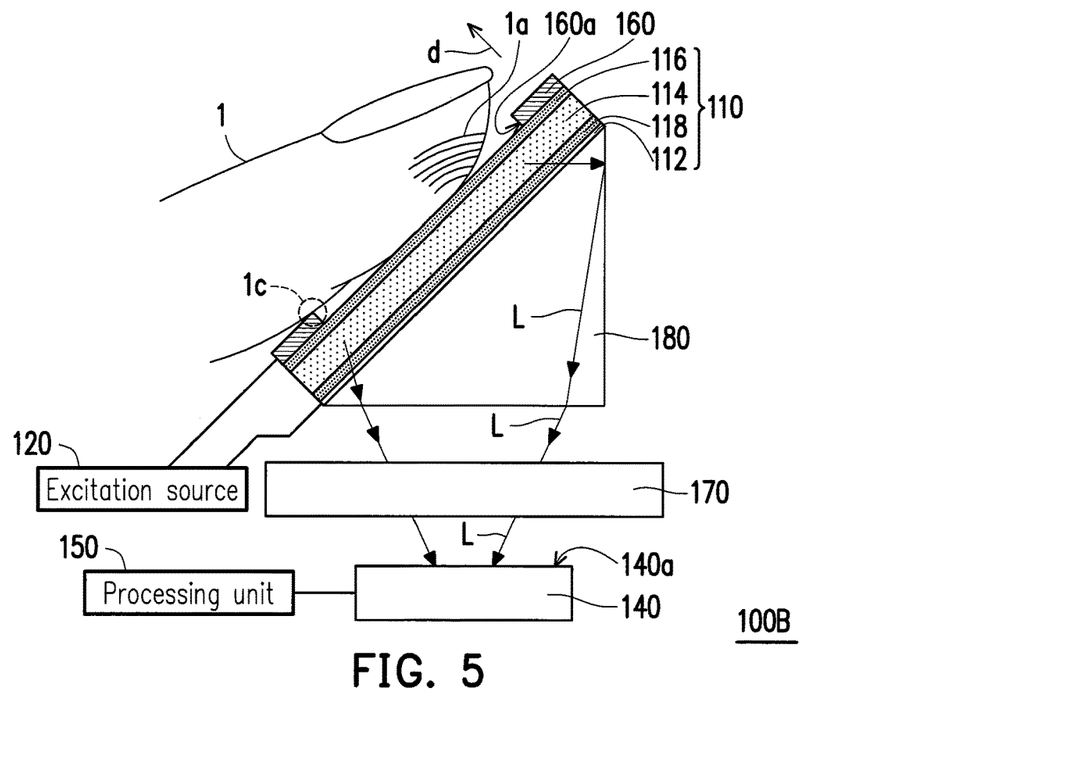
FIG. 5 is a schematic view illustrating an image capture apparatus according to still another embodiment of the disclosure.

FIG. 5 is a schematic view illustrating an image capture apparatus according to another embodiment of the disclosure. An image capture apparatus 100B in FIG. 5 is similar to the image capture apparatus 100A above; accordingly, identical or corresponding elements are denoted by identical or corresponding reference numerals. The main difference between the image capture apparatus 100B and image capture apparatus 100A lies in that the imaging unit 110 of the image capture apparatus 100B is disposed on a prism 180 but not disposed on the transparent substrate 130. The difference is described in details below. Please refer to the above descriptions for identical or corresponding features of the image capture apparatus 100B and image capture apparatus 100A.

Referring to FIG. 5, the image capture apparatus 100B includes the imaging unit 110 and light receiving device 140. The imaging unit 110 includes the electrode 112, the light emitting layer 114 disposed on the electrode 112 and first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L. Different from the image capture apparatus 100A, the image capture apparatus 100B includes the prism 180. The imaging unit 110 is disposed on the prism 180, and the prism 180 deflects the image light beam L so that the image light beam L is transmitted to the light receiving surface 140a of the light receiving device 140. Specifically, the prism 180 has two planar surfaces 180a and 180b that are vertical to each other and an inclined surface 180c connected with the two planar surfaces 180a and 180b. The imaging unit 110 is disposed on the inclined surface 180c of the prism 180 so it can be easily pressed by the object 1. The two planar surfaces 180a and 180b of the prism 180 reflects and/or refracts the image light beam L from the inclined surface 180c so that the image light beam L is transmitted to the light receiving surface 140a of the light receiving device 140. The shape of the prism 180 is not limited to a right triangular pillar. In other embodiments, the prism 180 may be a polygonal pillar as well.

Figure 6:
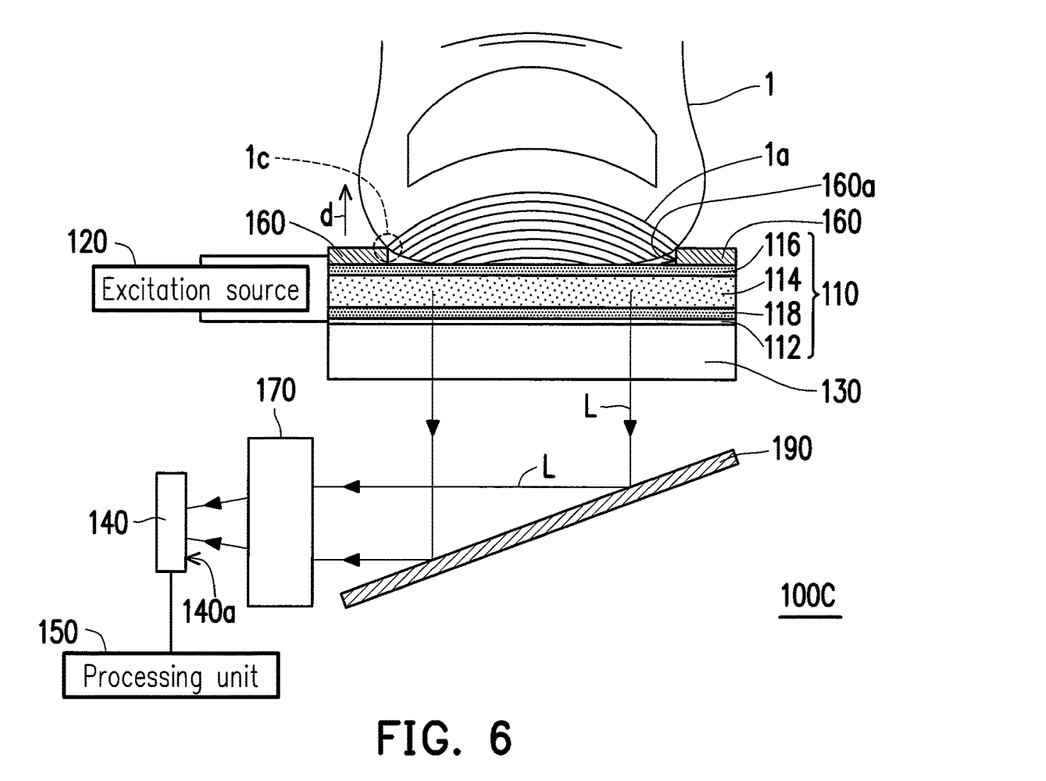
FIG. 6 is a schematic view illustrating an image capture apparatus according to still another embodiment of the disclosure.

FIG. 6 is a schematic view illustrating an image capture apparatus according to still another embodiment of the disclosure. An image capture apparatus 100C in FIG. 6 is similar to the image capture apparatus 100A above; accordingly, identical or corresponding elements are denoted by identical or corresponding reference numerals. The main difference between the image capture apparatus 100C and the image capture apparatus 100A lies in that the image capture apparatus 100C further includes a reflective element 190. The difference is described below in details. Please refer to the above descriptions for identical or corresponding features of the image capture apparatus 100C and image capture apparatus 100A.

Referring to FIG. 6, the image capture apparatus 100C includes the imaging unit 110 and the light receiving device 140. The imaging unit 110 includes the electrode 112, the light emitting layer 114 disposed on the electrode 112 and the first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L. Different from the image capture apparatus 100A, the image capture apparatus 100C further includes the reflective element 190. The reflective element 190 reflects the image light beam L so that the image light beam L is transmitted to the light receiving surface 140a of the light receiving device 140. The reflective element 190 can change the transmission path of the image light beam L so that there is more flexibility for the configuration position of the elements in the image capture apparatus 100C, thereby realizing the image capture apparatus 100C having a small size.

Figure 7:
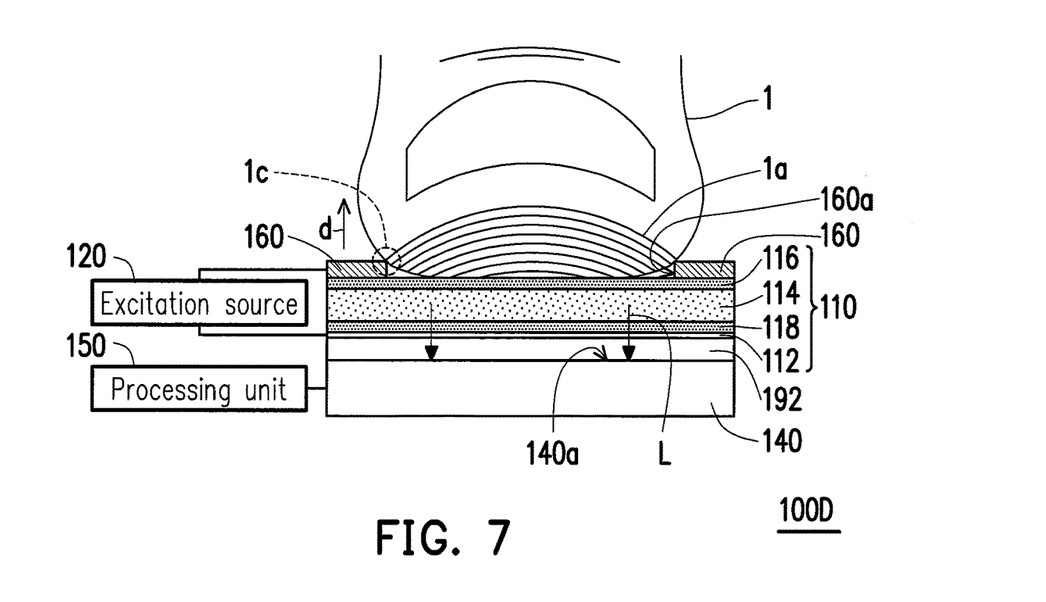
FIG. 7 is a schematic view illustrating an image capture apparatus according to an embodiment of the disclosure.

FIG. 7 is a schematic view illustrating an image capture apparatus according to an embodiment of the disclosure. In FIG. 7, an image capture apparatus 100D is similar to the image capture apparatus 100 described above; accordingly, identical or corresponding elements are denoted by identical or corresponding reference numerals. The main difference between the image capture apparatus 100D and image capture apparatus 100 lies in that the imaging unit 110 of the image capture apparatus 100D is disposed on the light guide layer 192 instead of the transparent substrate 130. The difference is described below in details. Please refer to the above descriptions for identical or corresponding features of the image capture apparatus 100D and image capture apparatus 100.

Referring to FIG. 7, the image capture apparatus 100D includes the imaging unit 110 and the light receiving device 140. The imaging unit 110 includes the electrode 112, the light emitting layer 114 disposed on the electrode 112 and the first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L. Different from the image capture apparatus 100, the image capture apparatus 100D further includes the light guide layer 192. The material of the light guide layer 192 may be an insulation material, though the disclosure is not limited thereto. The light guide layer 192 is formed on the light receiving device 140 and covers the light receiving surface 140a of the light receiving device 140. The imaging unit 110 is disposed on the light guide layer 192. An upper surface 192a and a lower surface 192b of the light guide layer 192 may be respectively in contact with the electrode 112 of the imaging unit 110 and the light receiving surface 140a of the light receiving device 140. The light guide layer 192 has slim thickness and can guide the image light beam L to form an image on the light receiving surface 140a so as to help achieve slim size of the image capture apparatus 100D. An inner surface of the light guide layer 192 close to the second electrode 112 may be similarly equipped with at least one reflective sheet or a micro-structure layer (not shown). The reflective sheets or micro-structure layers may be formed integrally and disposed continuously on the first surface or attached to the first surface via an adhesive, or arranged to be staggered with each other in the inner surface of the light guide layer 192 and/or a second surface close to the light receiving device.

Figure 8:
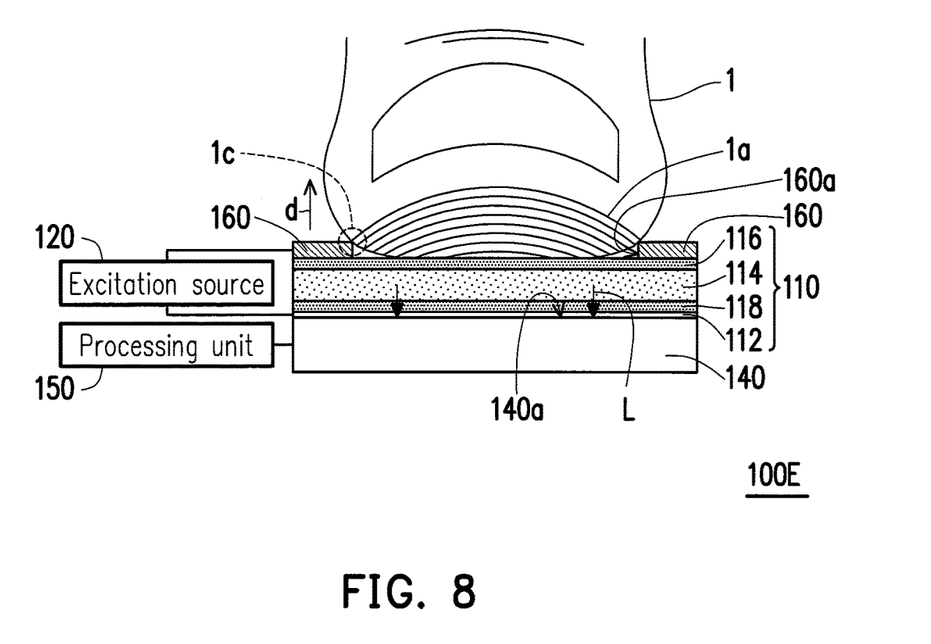
FIG. 8 is a schematic view illustrating an image capture apparatus according to another embodiment of the disclosure.

FIG. 8 is a schematic view illustrating an image capture apparatus according to another embodiment of the disclosure. In FIG. 8, an image capture apparatus 100E is similar to the image capture apparatus 100D; accordingly, identical or corresponding elements are denoted by identical or corresponding reference numerals. The main difference between the image capture apparatus 100E and the image capture apparatus 100D lies in that the imaging unit 110 of the image capture apparatus 100E is directly disposed on the light receiving surface 140a of the light receiving device 140 instead of the light guide layer 192. The difference is described in details below. Please refer to the above descriptions for identical or corresponding features of the image capture apparatus 100E and image capture apparatus 100D.

Referring to FIG. 8, the image capture apparatus 100E includes the imaging unit 110 and light receiving device 140. The imaging unit 110 includes the electrode 112, the light emitting layer 114 disposed on the electrode 112 and the first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L. Different from the image capture apparatus 100D, the imaging unit 110 is directly disposed on the light receiving device 140 to be directly in contact with the light receiving device 140.

Figure 9:
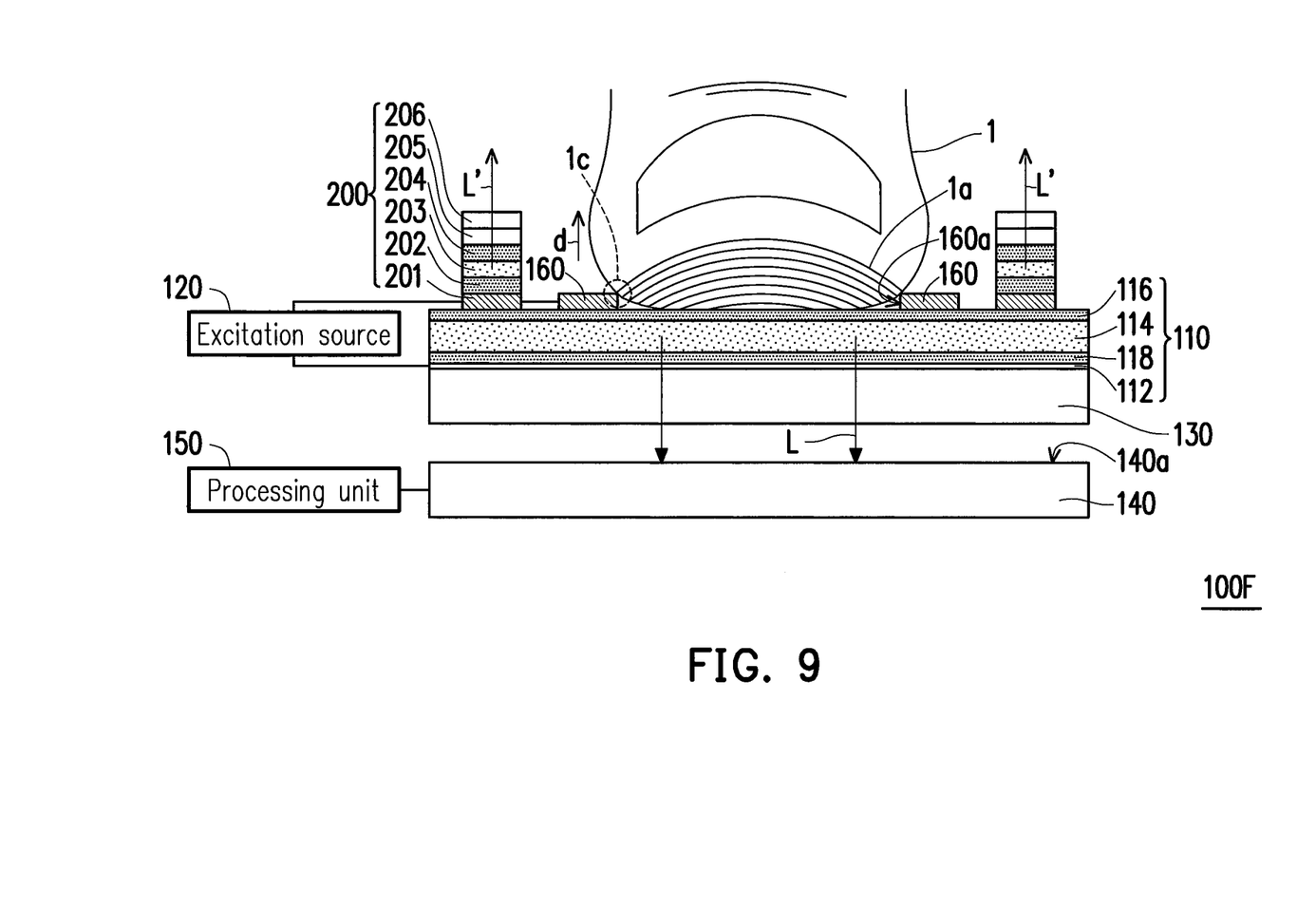
FIG. 9 is a schematic view illustrating an image capture apparatus according to still another embodiment of the disclosure.

FIG. 9 is a schematic view illustrating an image capture apparatus according to still another embodiment of the disclosure. In FIG. 9, an image capture apparatus 100F is similar to the image capture apparatus 100 described above; accordingly, identical or corresponding elements are denoted by identical or corresponding reference numerals. The main difference between the image capture apparatus 100F and the image capture apparatus 100 lies in that the image capture apparatus F further includes an indicating unit 200. The difference is described below in details. Please refer to the above descriptions for identical or corresponding features of the image capture apparatus 100F and image capture apparatus 100.

Referring to FIG. 9, the image capture apparatus 100F includes the imaging unit 110 and light receiving device 140. The imaging unit 110 includes the electrode 112, the light emitting layer 114 disposed on the electrode 112 and the first dielectric layer 116 disposed on the light emitting layer 114. At least one portion 1a of the object 1 is in contact with the portion 116a of the first dielectric layer 116 so that the light emitting layer 116a emits the image light beam L corresponding to the portion 116a of the first dielectric layer 116. The light receiving device 140 is disposed on the transmission path of the image light beam L.

Different from the image capture apparatus 100, the image capture apparatus 100F further includes the indicating unit 200 disposed on the imaging unit 110. The indicating unit 200 includes a first conductive pattern 201, a first dielectric pattern 202, a light emitting pattern 203, a second dielectric pattern 204, a second conductive pattern 205 and an insulation pattern 206 that are stacked sequentially in a direction (i.e. a direction which is parallel with or overlaps the direction d) away from the imaging unit 110. The light emitting pattern 203 is affected by a voltage difference between the first conductive pattern 201 and second conductive pattern 205 and thus emits an indicating light beam L'. The indicating light beam L' is transmitted toward the position (i.e. the position of the object 1) where the user is located. More specifically, in the embodiment, the first conductive pattern 201 may be a reflective electrode, and the second conductive pattern 205 may be a transparent electrode. A portion of the indicating light beam L' emitted by the light emitting pattern 203 may be reflected by the first conductive pattern 201 and pass through the second conductive pattern 205 to be transmitted to the user's eye, though the disclosure is not limited thereto.

Figure 10:
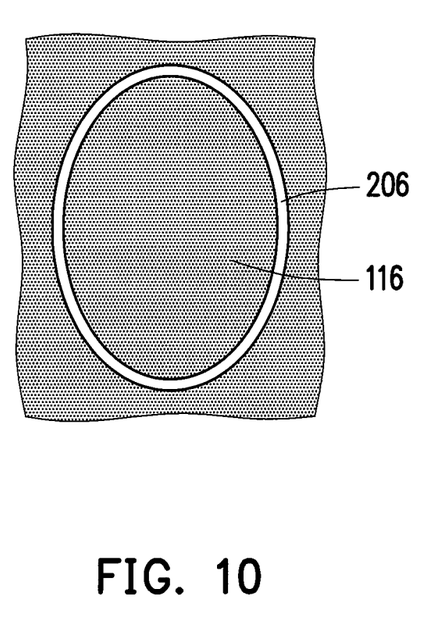
FIG. 10 is a top view illustrating an indicating unit according to an embodiment of the disclosure.

FIG. 10 is a top view illustrating an indicating unit according to an embodiment of the disclosure. Referring to FIGS. 9 and 10, when the image capture apparatus 100F is activated, the indicating unit 200 emits the indicating light beam L' to indicate the correct pressing position to the user. In the embodiment, the first conductive pattern 201, first dielectric pattern 202, light emitting pattern 203, second dielectric pattern 204, second conductive pattern 205 and insulation pattern 206 may be overlapped, and can be formed into an elliptical circular shape so as to define the correct pressing region (i.e. the elliptical region encircled by the insulation pattern 206 in FIG. 9), though the disclosure is not limited thereto. In other embodiments, the first conductive pattern 201, first dielectric pattern 202, light emitting pattern 203, second dielectric pattern 204, second conductive pattern 205 and insulation pattern 206 may not be necessarily overlapped. The correct pressing region may not be necessarily formed into an elliptical circular shape. In other embodiments, the correct pressing region may be designed to have other appropriate shapes. In addition, the indicating unit 200 may be applied in any one of the embodiments illustrated in FIG. 2 to FIG. 8; no further illustration is incorporated herein. The disclosure also seeks to protect the image capture apparatus which is formed by applying the indicating unit 200 to any one of the embodiments in FIG. 2 to FIG. 8.

In summary of the above, in the embodiments of the disclosure, the image capture apparatus includes the imaging unit and light receiving device. The imaging unit includes the electrode, light emitting layer disposed on the electrode and first dielectric layer disposed on the light emitting layer. When at least one portion of the object is in contact with one portion of the first dielectric layer, the portion of the light emitting layer corresponding to at least one portion of the object is excited to emit the image light beam corresponding to at least one portion of the object. Meanwhile, another portion of the object is not in contact with another portion of the first dielectric layer, and another portion of the light emitting layer corresponding to another portion of the first dielectric layer does not emit light. Accordingly, the light receiving device can receive the image of at least one portion of the object with high contrast ratio for easy identification.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An image capture apparatus, comprising:
    an imaging unit, comprising:
        an electrode;
        a light emitting layer, disposed on the electrode; and
        a dielectric layer, disposed on the light emitting layer;
    a light receiving device, wherein at least a portion of an object is in contact with a portion of the dielectric layer so that the light emitting layer emits an image light beam corresponding to the portion of the dielectric layer, and the light receiving device is disposed on a transmission path of the image light beam;

a conductive element, disposed on the dielectric layer of the imaging unit and having an opening exposing the dielectric layer, wherein a power supply is electrically connected with the conductive element, and the object is electrically connected with the power supply via the conductive element; and an indicating unit, disposed on the imaging unit, comprising:
a first conductive pattern;
a first dielectric pattern;
a light emitting pattern;
a second dielectric pattern;
a second conductive pattern; and
an insulation pattern, wherein the first conductive pattern, the first dielectric pattern, the light emitting pattern, the second dielectric pattern, the second conductive pattern and the insulation pattern are stacked sequentially in a direction away from the imaging unit.

2. The image capture apparatus according to claim 1, further comprising:
an excitation source, outputting an energy to the electrode of the imaging unit and the object, wherein the energy enables the light emitting layer to emit light.

3. The image capture apparatus according to claim 2, wherein the excitation source is the power supply and electrically connected with the electrode of the imaging unit and the object.

4. The image capture apparatus according to claim 3, further comprising:
a conductive element, integrated in the dielectric layer of the imaging unit, and having a sensor region for contacting the object, wherein the power supply is electrically connected with the conductive element, and the object is electrically connected with the power supply via the conductive element.

5. The image capture apparatus according to claim 1, wherein the imaging unit further comprises:
a second dielectric layer, disposed between the light emitting layer and the electrode.

6. The image capture apparatus according to claim 1, further comprising:
a lens, disposed between the imaging unit and the light receiving device, wherein the image light beam passes through the lens to form an image on a light receiving surface of the light receiving device.

7. The image capture apparatus according to claim 1, further comprising:
a prism, wherein the imaging unit is disposed on the prism, and the prism deflects the image light beam so that the image light beam is transmitted to a light receiving surface of the light receiving device.

8. The image capture apparatus according to claim 1, wherein the imaging unit is directly disposed on the light receiving device to be in contact with the light receiving device.

9. The image capture apparatus according to claim 1, further comprising:
a light guide layer, covering a light receiving surface of the light receiving device, wherein the imaging unit is disposed on the light guide layer.

10. The image capture apparatus according to claim 1, further comprising:

a reflective element, disposed to incline with respect to the imaging unit, reflecting the image light beam so that the image light beam is transmitted to a light receiving surface of the light receiving device.

11. The image capture apparatus according to claim 1, wherein the dielectric layer comprises a surface hard-coating layer.

12. The image capture apparatus according to claim 1, wherein the imaging unit further comprises:
a second dielectric layer, disposed between the light emitting layer and the electrode, wherein a hardness of the dielectric layer is greater than a hardness of the second dielectric layer.

13. The image capture apparatus according to claim 1, wherein the light emitting layer is a mixed layer of a light emitting material and a dielectric material.

14. An image capture apparatus, used to capture an image of an object, comprising:
an imaging unit, comprising:
a transparent substrate, carrying at least an electrode;
a light emitting layer, disposed on the electrode; and
a dielectric layer, disposed on the light emitting layer;
a light receiving device, wherein at least one portion of the object is in contact with a portion of the dielectric layer so that the light emitting layer emits an image light beam corresponding to the portion of the dielectric layer, and the light receiving device is disposed on a transmission path of the image light beam;
a conductive element, disposed on the dielectric layer of the imaging unit to define at least one non-image capture region of the dielectric layer not in contact with the at least one portion of the object;
an excitation source, electrically connected between the conductive element and the electrode; and
an indicating unit, disposed on the imaging unit, the indicating unit comprising:
a first conductive pattern;
a first dielectric pattern;
a light emitting pattern;
a second dielectric pattern;
a second conductive pattern; and
an insulation pattern, wherein the first conductive pattern, the first dielectric pattern, the light emitting pattern, the second dielectric pattern, the second conductive pattern and the insulation pattern are stacked sequentially in a direction away from the imaging unit.

15. The image capture apparatus according to claim 14, wherein the imaging unit further comprises:
a second dielectric layer, disposed between the light emitting layer and the electrode.

16. The image capture apparatus according to claim 14, further comprising:
a lens, disposed between the imaging unit and the light receiving device, wherein the image light beam passes through the lens to form an image on a light receiving surface of the light receiving device.

17. The image capture apparatus according to claim 14, further comprising:
a prism, wherein the imaging unit is disposed on the prism, and the prism deflects the image light beam so that the image light beam is transmitted to a light receiving surface of the light receiving device.

18. The image capture apparatus according to claim 14, wherein the imaging unit is directly disposed on the light receiving device to be in contact with the light receiving device.

19. The image capture apparatus according to claim 14, further comprising:
   a light guide layer, covering a light receiving surface of the light receiving device, wherein the imaging unit is disposed on the light guide layer.

20. The image capture apparatus according to claim 14, further comprising:
   a reflective element, disposed to incline with respect to the imaging unit, reflecting the image light beam so that the image light beam is transmitted to a light receiving surface of the light receiving device.

21. The image capture apparatus according to claim 14, wherein the dielectric layer comprises a surface hard-coating layer.

22. The image capture apparatus according to claim 14, the imaging unit further comprising:
   a second dielectric layer, disposed between the light emitting layer and the electrode, wherein a hardness of the dielectric layer is greater than a hardness of the second dielectric layer.

23. The image capture apparatus according to claim 14, wherein the light emitting layer is a mixed layer of a light emitting material and a dielectric material.

* * * * *